US006766104B2

(12) United States Patent
Hori et al.

(10) Patent No.: US 6,766,104 B2
(45) Date of Patent: Jul. 20, 2004

(54) APPARATUS AND METHOD FOR PLAYING BACK VIDEO

(75) Inventors: Masahiro Hori, Kusatsu (JP); Yoshifumi Sakamoto, Shiga-ken (JP)

(73) Assignee: International Buisness Machines Corporation, Armonk, NY (US)

(*) Notice: Subject to any disclaimer, the term of this patent is extended or adjusted under 35 U.S.C. 154(b) by 250 days.

(21) Appl. No.: 10/000,927

(22) Filed: Oct. 24, 2001

(65) Prior Publication Data

US 2002/0118957 A1 Aug. 29, 2002

(30) Foreign Application Priority Data

Oct. 26, 2000 (JP) ........................................ 2000-327562

(51) Int. Cl.[7] .............................................. H04N 7/26
(52) U.S. Cl. ...................................... 386/111; 386/112
(58) Field of Search ................................ 386/131, 109, 386/46, 110, 111, 112; 348/441

(56) References Cited

U.S. PATENT DOCUMENTS

| 6,266,480 B1 | * | 7/2001 | Ezaki et al. ................... 386/94 |
| 6,278,839 B1 | * | 8/2001 | Asada et al. ................. 386/126 |
| 2003/0161614 A1 | * | 8/2003 | Yanagihara et al. ........... 386/95 |
| 2003/0170005 A1 | * | 9/2003 | Ko et al. ....................... 386/96 |
| 2003/0170009 A1 | * | 9/2003 | Itoh et al. ................... 386/111 |

FOREIGN PATENT DOCUMENTS

JP  11-505587  3/2002

* cited by examiner

*Primary Examiner*—Chris Kelley
*Assistant Examiner*—Alicia M. Duggins
(74) *Attorney, Agent, or Firm*—Ronald A. D'Alessandro; Hoffman, Warnick & D'Alessandro LLC

(57) ABSTRACT

To prevent unauthorized copying of video data transmitted from an MPEG-2 decoder to an NTSC encoder, data format of video data to be transmitted from an MPEG-2 decoder to an NTSC encoder is dynamically changed (S104, S112, and S118).

20 Claims, 8 Drawing Sheets

APPARATUS AND METHOD FOR PLAYING BACK VIDEO

FIELD OF THE INVENTION

The present invention relates to an apparatus for video playback for decoding video data encoded by a predetermined encoding system and encoding the decoded video data into a signal for displaying on a screen of a display device and a method thereof.

DESCRIPTION OF RELATED ART

When video data is recorded on a record medium, such as a DVD (Digital Video Disk, or Digital Versatile Disk) or when video data is distributed on the internet, the data is often encoded using the MPEG-2 (Moving Picture Expert Group Phase 2) digital compression standard. To play back or reproduce MPEG-2 data, an MPEG-2 decoder, for returning the data to the original video data by decoding the data, is required. Further, an NTSC (National Television System Committee) encoder for encoding the video data decoded by the MPEG-2 decoder into a signal capable of being output to a television is required.

FIG. 4 shows an example of the structure of a video playback apparatus 10 having a playback function capable of decoding an MPEG-2 encoded data stream. A NIM (Network Interface Module) 12 is connected to a communication line to control transmitting and receiving data. For example, when a satellite communication line is used, a parabolic antenna is connected to the NIM 12. The Internet may also be accessed by connecting a telephone line to the NIM 12. An MPEG-2 TS (Transport Stream) obtained by multiplexing a plurality of MPEG-2 data and associated data such as a program list is transmitted in a satellite broadcast.

Each data included in the MPEG-2 TS is separated by an MPEG-2 TS demultiplexer 20. One MPEG-2 data is extracted out of a plurality of MPEG-2 data. An MPU (Microprocessor Unit) 24 specifies the MPEG-2 data to be extracted by the demultiplexer 20. The data extracted by the demultiplexer 20 is transmitted to an MPEG-2 decoder 22 to be decoded. The program list is also extracted by the demultiplexer 20 to be transmitted to MPU 24.

The video data decoded by the MPEG-2 decoder 22 is transmitted to an NTSC encoder 32 through a graphic processor 30. The graphic processor 30 performs display processing for characters and images processed by MPU 24. For example, display processing is performed to superimpose a program list on the data decoded by the MPEG-2 decoder 22. The data transmitted to the NTSC encoder 32 is encoded into, for example, an NTSC signal. The data encoded into the NTSC signal is supplied to a video input terminal of a television (not shown).

Nowadays, a web-site browsing function is often added to video playback apparatus. Since the graphic processor 30 performs display processing of Web pages, a higher-speed graphic processor becomes necessary. In addition, MPEG-2 decoders adaptable to high-definition television broadcasts or MPEG-2 decoders capable of simultaneously decoding a plurality of MPEG-2 data may be used. To provide a system configuration suitable for such requirements, as shown in FIGS. 4 and 5, in many cases, the MPEG-2 decoder 22, MPU 24, and the MPEG-2 TS demultiplexer 20 are integrated on a single chip (14), and the processor 30 and the encoder 32 are integrated on a single chip (16).

A typical example of a data format of video data transmitted from the MPEG-2 decoder 22 to the NTSC encoder 32 is ITU-R (International Telecommunication Union-Radio Communication Sector) Recommendation BT.601. The ITU-R BT.601 defines the type of coding of color information, such as RGB, YUV4:4:4, and YUV4:2:2. In this case, RGB is a coding type indicating color information by red (R), green (G), and blue (B). YUV is a coding type indicating color information by brightness (Y), color difference in red (U), and in blue (V).

For YUV4:4:4, the ratio of the number of samples of brightness (Y), color difference in red (U), and color difference in blue (V) is equal. For YUV4:2:2:, the ratio of the number of samples of brightness (Y), color difference in red (U) and color difference in blue (V) is 2:1:1. The coding type YUV4:2:2 of ITU-R BT.601 is hereinafter referred to as BT.601 (YUV4:2:2).

The data format also defines the type of the order of data transmission. In the case of the recommendation BT.601 (YUV4:2:2), some types are defined for the order of data transmission, such as VYUY and UYVY. In the case of the BT.601 (RGB), some types are defined for the order of data transmission, such as GBR and BRG.

Further, the data format defines the bus width used for data transmission, such as 8 bits and 16 bits.

As shown in FIGS. 6(a) and 6(b), the data format setting is stored in a format register FR22 included in the MPEG-2 decoder 22, a format register FR30 included in the graphic processor 30, and a format register FR32 included in the NTSC encoder 32.

As shown in FIG. 6(b), data α indicating the type of coding, such as the BT.601 (RGB), the BT.601 (YUV4:4:4), and the BT.601 (YUV4:2:2), data β indicating the order of data transmission, such as VYUV, UYVY, GBR, and BRG, and data γ indicating the bus width for data transmission, such as 8 bits and 16 bits, are stored, respectively, in the registers FR22, FR30, and FR32.

Table 1 shows an example of data format types which can be used in the MPEG-2 decoder 22.

TABLE 1

| Data α | Data β | Data γ |
| --- | --- | --- |
| RGB | RGB | 8 bits |
|  |  | 16 bits |
|  | GBR | 8 bits |
|  |  | 16 bits |
|  | BRG | 8 bits |
|  |  | 16 bits |
| YUV4:4:4 | UYV | 8 bits |
|  |  | 16 bits |
|  | VYU | 8 bits |
|  |  | 16 bits |
|  | YVU | 8 bits |
|  |  | 16 bits |
| YUV4:2:2 | UYVY | 8 bits |
|  |  | 16 bits |
|  | VYUY | 8 bits |
|  |  | 16 bits |
|  | YVUY | 8 bits |
|  |  | 16 bits |

Table 2 shows an example of data format types which can be used in the graphic processor 30 and the NTSC encoder 32.

TABLE 2

| Data α | Data β | Data γ |
|---|---|---|
| RGB | GBR | 8 bits |
|  |  | 16 bits |
|  | BRG | 8 bits |
|  |  | 16 bits |
| YUV4:4:4 | UYV | 8 bits |
|  |  | 16 bits |
|  | VYU | 8 bits |
|  |  | 16 bits |
| YUV4:2:2 | UYVY | 8 bits |
|  |  | 16 bits |
|  | VYUV | 8 bits |
|  |  | 16 bits |
|  | YUYV | 8 bits |
|  |  | 16 bits |
|  | YVYU | 8 bits |
|  |  | 16 bits |

One of the types defined in both Table 1 and Table 2 is selected for each item. For example, as shown in FIG. 6(c), data α can be set to YUV4:2:2, data β can be set to UYVY, and data γ can be set to 8 bits. The setting shown in FIG. 6(c) are stored in a memory element (not shown), such as a ROM (Read Only Memory) or a flash memory so that MPU 24 may set a data format based on the contents of this memory. Data format setting usually remains fixed to only one kind of data format.

The MPEG-2 decoder 22, the graphic processor 30, and the NTSC encoder 32 work based on the respective setting of the registers FR22, FR30, and FR32. For example, as shown in FIG. 7, when the bus width is 8 bits, only the solid line portion of wiring 42 is used, and when the bus width is 16 bits, both the solid line portion and broken line portion of the wiring 42 are used. Further, a controlling method for data transmission is also changed depending on the setting of the registers FR22, FR30, and FR32 since YUV4:4:4 and YUV4:2:2 differ in data ratio of brightness Y and color differences UV, and the bus widths of 8 bits and 16 bits differ in amount of data transferred at one time.

The video data that is provided as output from the video playback apparatus 10, shown in FIG. 4, to a television can be copied using a general video deck. However, copying of video data that is output to the television can be prevented by using an NTSC encoder with Macrovision (trademark) copy protection, which is an example of a copy protection method.

It is, however, possible to extract video data in chips 14 and 16 shown in FIG. 5 from the wiring 42, via conductive holes 44, and chip terminals 46 for connecting the chips 14 and 16. Since the video data extracted at these points is digital data, copying is easy and in addition, the copied video data is not deteriorated. Usually, particular anticopy steps are not taken because these chips 14 and 16 are located within the video playback apparatus 10.

It is an object of the present invention to prevent unauthorized copying of video data transmitted from an MPEG-2 decoder to a format encoder.

SUMMARY OF THE INVENTION

The video playback apparatus according to the present invention comprises a playback decoder for decoding video data encoded by a predetermined encoding system; a display encoder for encoding the decoded video data into a display signal to be output to a display device; format setting means for setting a data format for the video data to be transmitted from the playback decoder to the display encoder; and format changing means for changing the data format set by the format setting means. The data format of the video data transmitted from the playback decoder to the display encoder can be selected from a plurality of data formats by changing the data format set by the format setting means.

The method for playing back video data according to the present invention comprises the steps of setting a data format for video data; decoding the video data encoded by a predetermined encoding system into the video data whose data format is set by the format setting step; encoding the decoded video data into a display signal to be output to a display device; and changing the data format set by the format setting step.

According to the present invention, the data format for video data to be transmitted from the MPEG-2 decoder to the NTSC encoder is dynamically changed by an MPU. This is effective to prevent unauthorized copying of video data.

DESCRIPTION OF THE PREFERRED EMBODIMENTS

Figure 4:
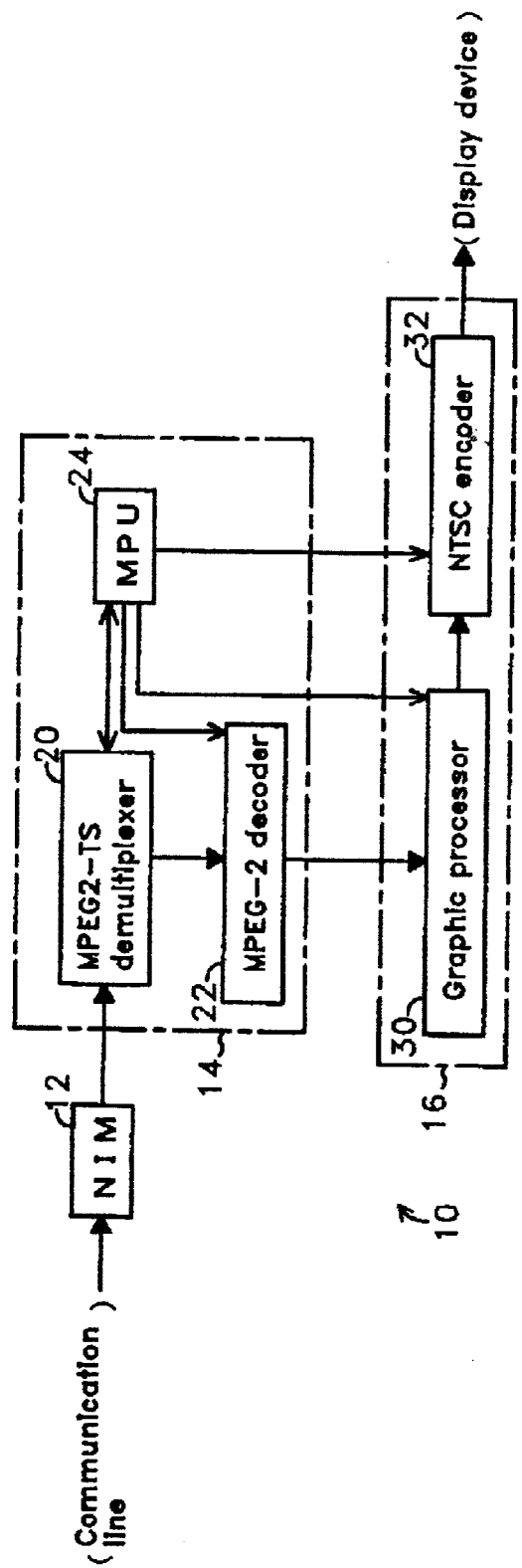
FIG. 4 is a block diagram of a video playback apparatus.
Figure 5:
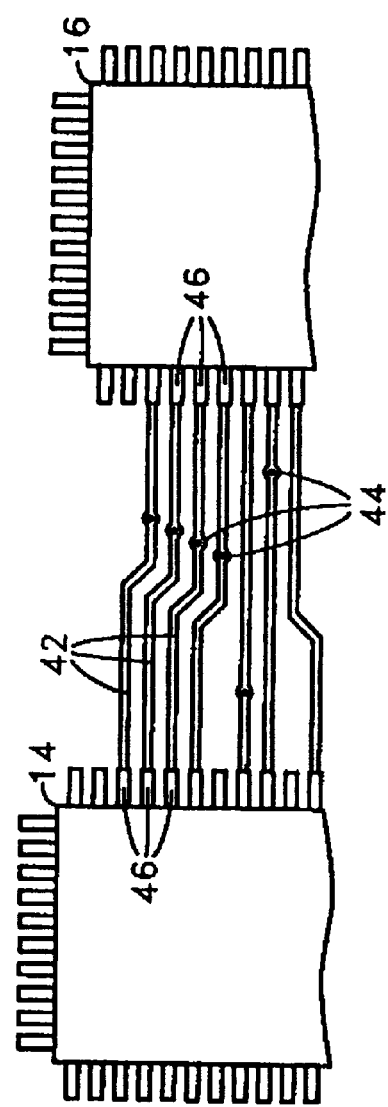
FIG. 5 shows an example of wiring between a chip including the MPEG2 decoder and a chip including the NTSC encoder shown in FIG. 4.

Next, a preferred embodiment of an apparatus for playing back video and a method thereof according to the present invention will be described in detail with reference to the accompanying drawings. As shown in FIG. 4, a video playback apparatus 10 of the present invention comprises an NIM 12, an MPEG2-TS demultiplexer 20, an MPEG-2 decoder 22, an MPU 24, a graphic processor 30, and an NTSC encoder 32. As shown in FIGS. 4 and 5, the MPEG-2 decoder 22, MPU 24, and the MPEG-2 TS demultiplexer 20 are integrated on a single chip (14) and the NTSC encoder 32 and the graphic processor 30 are integrated on a single chip (16).

Figure 6:
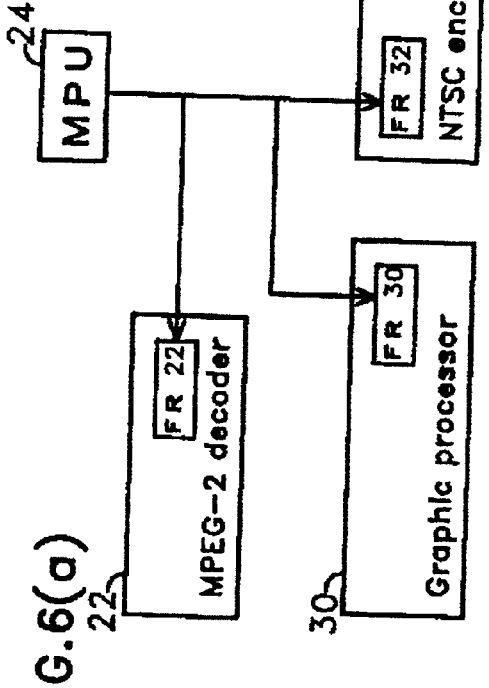
FIG. 6(a) is a view in which an essential part of the video playback apparatus shown in FIG. 4 is enlarged.
FIG. 6(b) shows an example of a setting stored in the format registers shown in FIG. 6(a).
FIG. 6(c) shows an example of the data format setting shown in FIG. 6(b).
Figure 7:
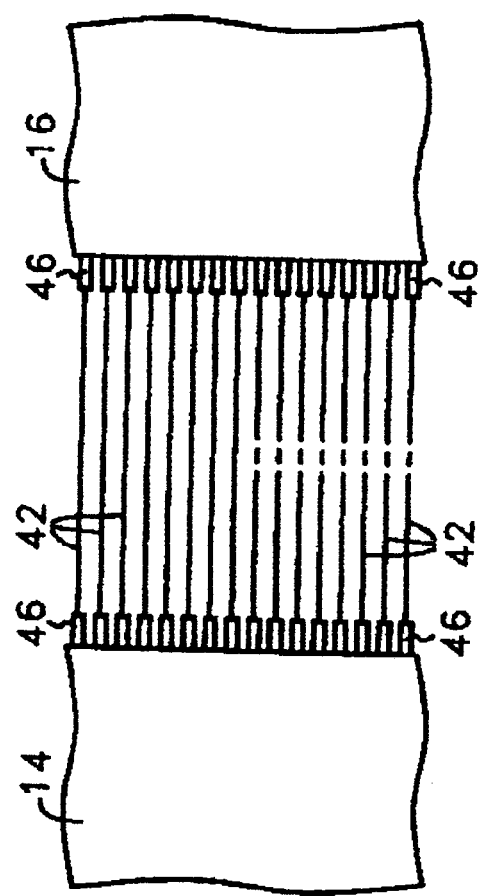
FIG. 7 is a wiring view showing an example of data transmission buses of video data transmitted from an MPEG-2 decoder to an NTSC encoder of a video playback apparatus according to the present invention.

As shown in FIG. 6(a), the MPEG-2 decoder 22, the graphic processor 30, and the NTSC encoder 32 include format registers FR22, FR30, and FR32, respectively wherein a data format of the video data transmitted from the MPEG-2 decoder 22 to the NTSC encoder 32 through the graphic processor 30 is set. The above-mentioned configuration may be the same as those of conventional ones.

In the present invention, the data format set in the registers FR22, FR30, and FR32 is changed using MPU 24. The data format of the video data transmitted from the MPEG-2 decoder 22 to the NTSC encoder 32 varies in response to the change in setting of FR22, FR30, and FR32. MPU 24 performs synchronization control between the data format of the video data decoded by the MPEG-2 decoder 22 and the data format of the video data encoded by the NTSC encoder 32.

In this embodiment, ITU-R BT.601 (YUV4:4:4) and BT.601 (YUV4:2:2) are used as the format types for coding. In addition, for the order of data transmission, two format types, i.e., VYU and UYV are used for YUV4:4:4, and two format types, i.e., VYUY and UYVY are used for YUV4:2:2. The bus width of data to be transmitted has two format types; 8 bits and 16 bits.

Each time the television begins to playback or reproduce the MPEG-2 data, the BT.601 (YUV4:4:4) is switched to the BT.601 (YUV4:2:2), and vice versa in this embodiment. For example, when playing back of MPEG-2 data starts or the screen display is switched from a program list display to a playback display of the MPEG-2 data, MPU 24 changes data α of FR22, FR30, and FR32 shown in FIG. 6(b).

Further, MPU 24 changes the order of data transmission and the bus width of data transmission at predetermined time intervals. In this embodiment, the order and the bus width of the data transmission are changed in response to horizontal and vertical synchronizing pulse, respectively, of an NTSC signal output from the NTSC encoder 32 to the television.

For example, the order of the data transmission (VYUY and UYVY, or VYU and UYV) is changed at intervals of four pulses of horizontal synchronization of the NTSC signal and then the bus width of the data to be transmitted (8 bits and 16 bits) is changed at intervals of one pulse of vertical synchronization of the NTSC signal. MPU 24 monitors the NTSC signal and changes data β of FR22, FR30, and FR32 shown in FIG. 6(b) each time four pulses of horizontal synchronization is detected. Similarly, MPU 24 changes data γ of FR22, FR30, and FR32 shown in FIG. 6(b) each time one pulse of vertical synchronization is detected.

Figure 2:
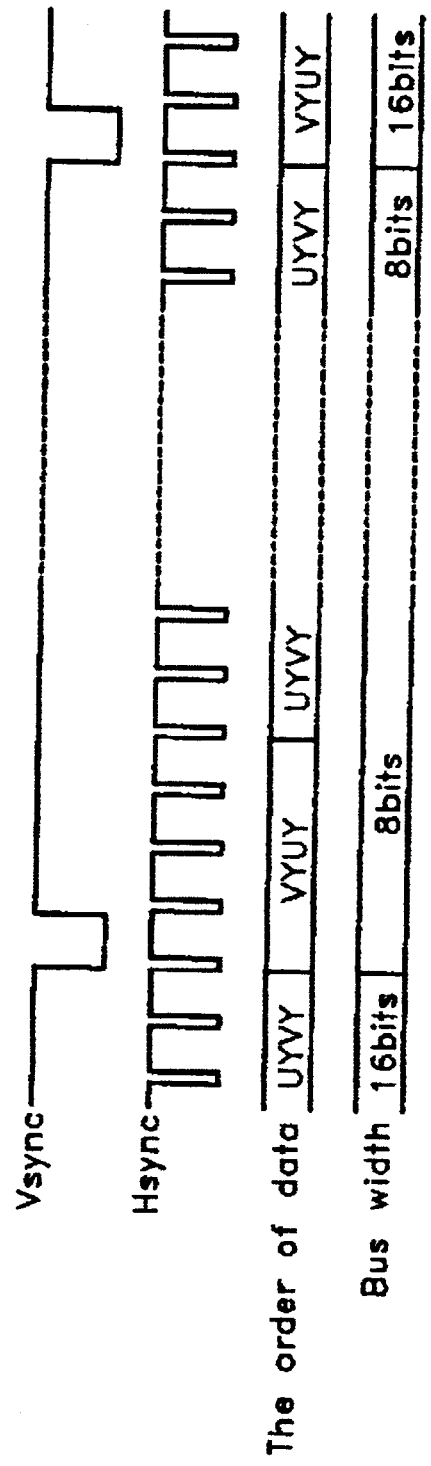
FIG. 2(a) shows an example of alternative setting of data formats.
FIG. 2(b) is a timing chart showing horizontal synchronization (Hsync) and vertical synchronization (Vsync) of an NTSC signal of an NTSC encoder and changes of the data formats according to the present invention.

As shown in FIG. 2(a), the types for data α, β, γ are stored in a memory element (not shown), such as ROM (Read Only Memory) or a flash memory and then MPU 24 changes the data format depending on the contents of the memory.

Next, a description will be given of the operation of such apparatus and method for playing back video.

MPU 24 of the video playback apparatus 10 sets a data format of video data to be transmitted from the MPEG-2 decoder 22 to the NTSC encoder 32 via the graphic processor 30. The MPEG-2 decoder 22 decodes the MPEG-2 data extracted by the MPEG-2 TS demultiplexer 20 into the video data whose data format has been set by MPU 24. The decoded data is transmitted to the NTSC encoder 32 through the graphic processor 30 to be encoded into the NTSC signal.

MPU 24 changes the data format of the video data to be transmitted from the MPEG-2 decoder 22 to the NTSC encoder 32 in the present invention. The change of the data format does not cause any adverse influence on playback and display of the video data because MPU 24 synchronizes the data format of the data decoded by the MPEG-2 decoder 22 and the data format of the data to be encoded by the NTSC encoder 32.

Figure 1:
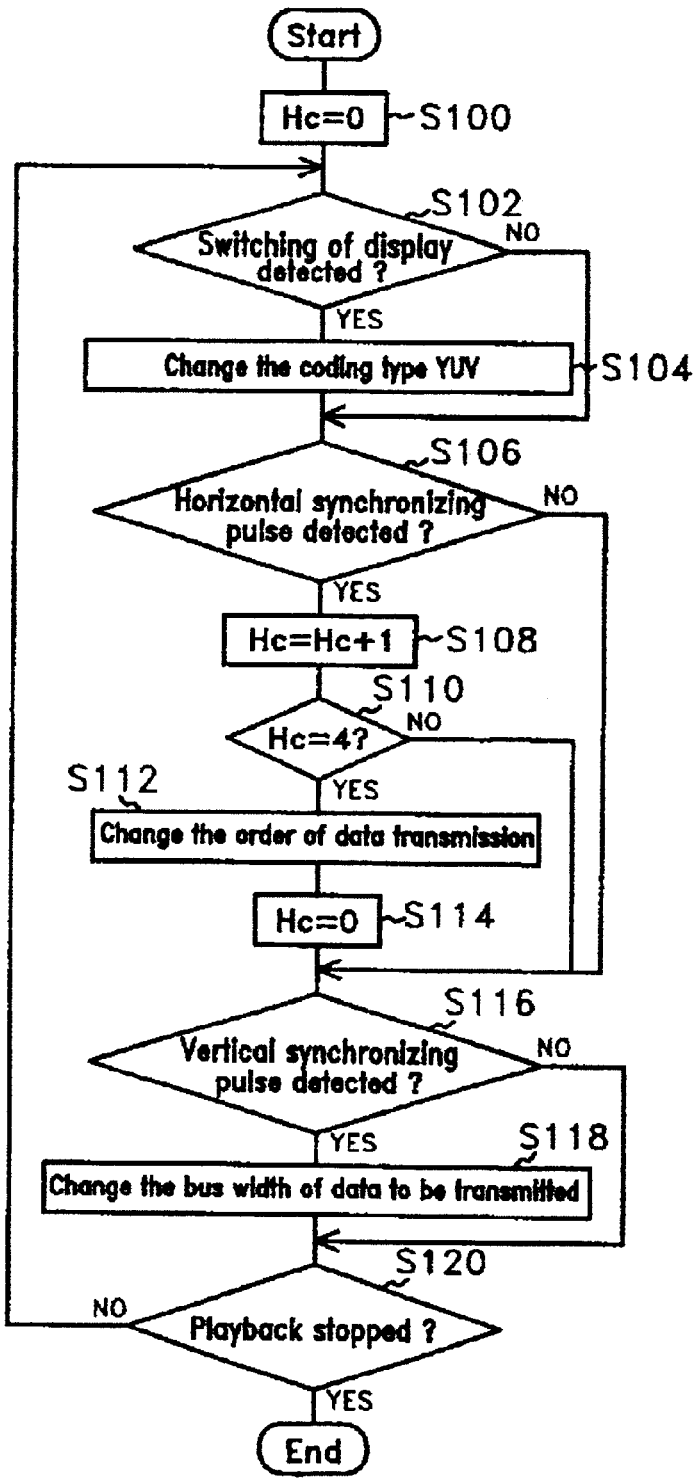
FIG. 1 is a flow chart showing an example of switching procedures of video data transmitted from an MPEG-2 decoder to an NTSC encoder of a video playback apparatus according to the present invention.

FIG. 1 shows an example of procedures for changing the data format. Hc is a count value indicating the number of horizontal synchronizing (Hsync) pulses of the NTSC signal detected. The initial value of Hc is set to zero (S100).

When playing back of the MPEG-2 data is initiated or the switching of display from the program list screen to the video playback screen is detected (S102), MPU 24 changes the coding type of YUV in the BT.601 (S104). The BT.601 (YUV4:4:4) and the BT.601 (YUV4:2:2) are switched alternately by changing data α in the format registers FR22, FR30, and FR32 in this embodiment.

MPU 24 monitors the NTSC signal of the NTSC encoder 32 and adds "1" to the count value Hc (S108) each time a horizontal synchronizing pulse is detected (S106). When the count value Hc reaches four (S110), MPU 24 changes the order of data transmission (S112). UYVY and VYUY (or UYV and VYU) are alternately switched by changing data β in the format registers FR22, FR30, and FR32 in this embodiment. MPU 24 resets Hc to zero (S114) after the change (S112) is completed.

MPU 24 monitors the NTSC signal and changes the bus width of data to be transmitted (S118) after a vertical synchronizing pulse (Vsync) is detected (S116). In this embodiment, 8 bits and 16 bits are alternately switched by changing data γ in the format registers FR22, FR30, and FR32.

The above-mentioned processing is repeated until the playback of the MPEG-2 data is stopped (S120). As shown in FIG. 2(a), in the case of BT.601 (YUV4:2:2), the order of data (UYVY and VYUY) is switched at intervals of four pulses of horizontal synchronization (Hsync). In addition, the bus width (8 bits and 16 bits) is switched at intervals of one pulse of vertical synchronization.

Thus, changing the data format at predetermined time intervals allows the data format for the video data between the MPEG-2 decoder 22 and the NTSC encoder 32 to be variable. To play back the video data copied by an unauthorized user, the user has to switch the data format between YUV4:4:4 and YUV4:2:2 because YUV4:4:4 and YUV4:2:2 of the BT.601 are switched at predetermined intervals. The data format setting in a general video playback apparatus is substantially fixed, so that it is impossible to clearly play back the video data copied by an unauthorized user.

Further the present invention dynamically changes the format types for the order and the bus width of data transmission at predetermined time intervals, which leads to further difficulties in playing back the copied video data.

As described above, one embodiment according to the present invention has been described so far, but the present invention is not limited to this embodiment. For example, data α (YUV, RGB), data β (order of data), and data γ (bus width) are changed in FIG. 1, but alternatively only any one or two of them can be changed. If only one or two items are changed, only one or two of the processing in S102 and S104; the processing in S100, and S106 to S114; and the processing in S116 and S118 shown in FIG. 1 may be performed. Any data format may be employed for the data format of the video data.

Although the order and the bus width of data transmission are changed according to horizontal and vertical synchronization of the NTSC signal in FIG. 1, the order of the data transmission may be changed every two pulses of horizontal synchronization and the bus width of the data transmission may be changed every four pulses of horizontal synchronization. Or the order of data transmission may be changed every one pulse of vertical synchronization and the bus width of data transmission may be changed every two pulses of vertical synchronization. The data format may be changed for each arbitrary number of pulses of horizontal or vertical synchronization. For example, the order of the data shown in FIG. 1 may be changed (S112) when Hc is eight. Or the bus width may be changed (S118) each time vertical synchronization (Vsync) is counted to four pulses, if a count value Vc indicating the number of pulses of vertical synchronization is provided and controlled in a similar manner to changing the order of the data (S106 to S114).

Figure 3:
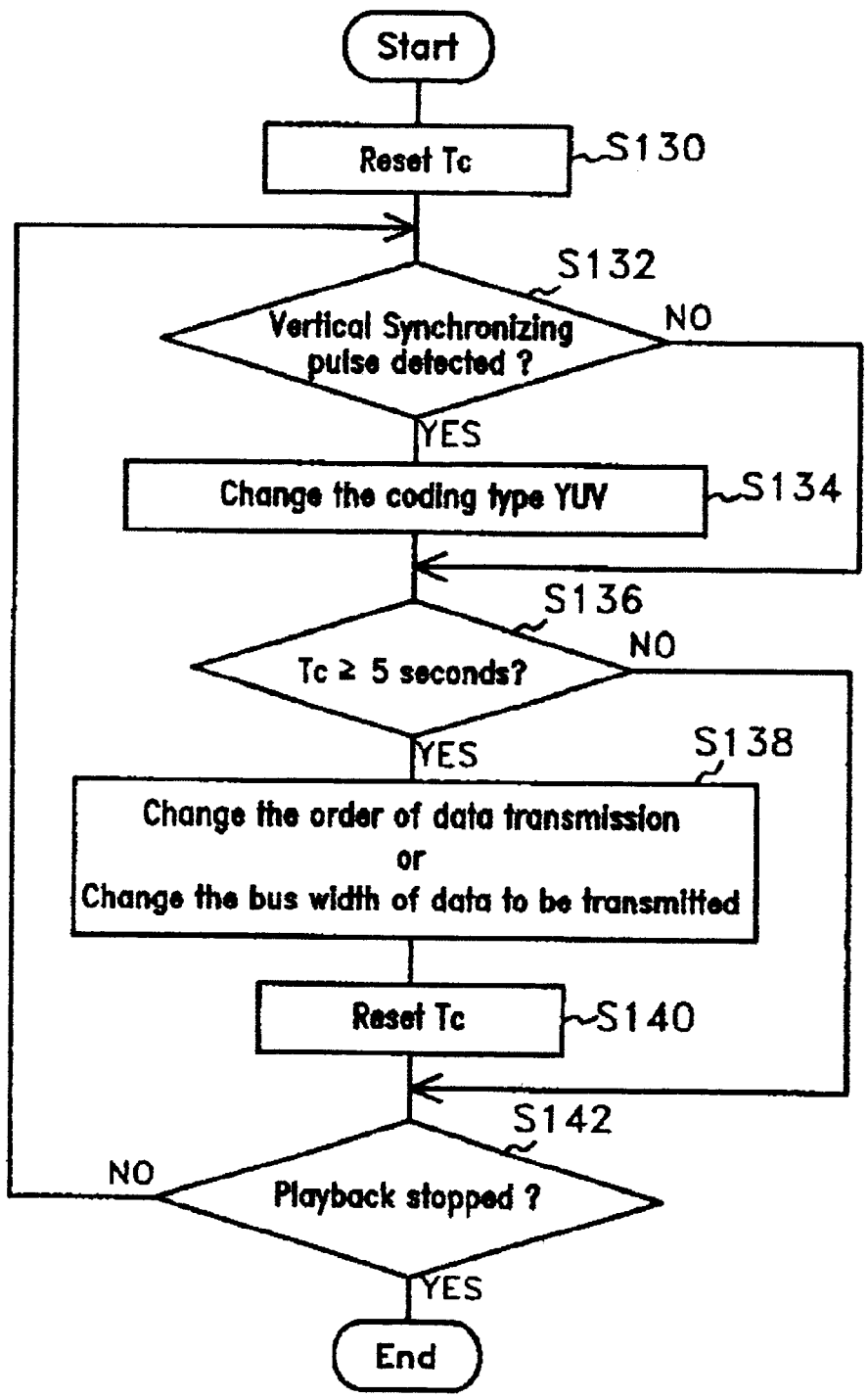
FIG. 3 is a flow chart of switching procedures of data formats for video data transmitted from an MPEG-2 decoder to an NTSC encoder of a video playback apparatus according to the present invention.

Alternatively, the BT.601 (YUV4:4:4) and the BT.601 (YUV4:2:2) shown in FIG. 1 may be switched at predetermined time intervals, as well as changing the order and the bus width of the data to be transmitted. Further, as shown in FIG. 3, the BT.601 (YUV4:4:4) and the BT.601 (YUV4:2:2) may be changed (S134) when a vertical synchronizing pulse is detected (S132).

In FIG. 1, the data format types for the order of the data transmission and the bus width of the data transmission have been changed based on horizontal and vertical synchronizing pulses but may be changed at predetermined time intervals. For example, as shown in FIG. 3, it is possible to reset a timer Tc at first (S130), change the order of data or the bus width (S138) when this timer has reached five seconds (S136), and reset the Tc (S140).

The data format may be changed at fixed time intervals, but the format may be changed at arbitrary time intervals based on random numbers generated by MPU. Similarly, changing the order of the data format may be made in the fixed order, but the format may be changed in arbitrary order based on random numbers generated by MPU. The change of the data format at random time intervals or in the random order using random numbers makes it more difficult to identify the data format, which in turn makes unauthorized copying of the video data more difficult.

Figure 8:
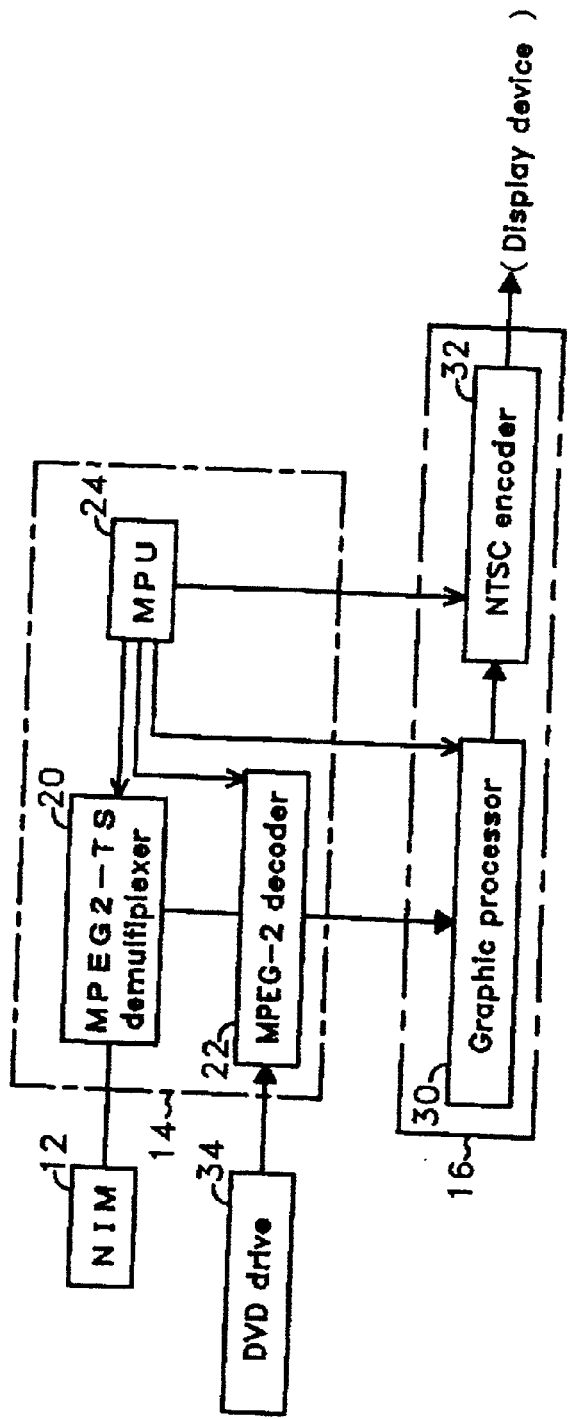
FIG. 8 is a block diagram showing an example of a video playback apparatus including a DVD drive.

Since FIG. 4 illustrates receiving of a satellite broadcast, the MPEG-2 data is input to the MPEG-2 decoder 22 through the NIM 12 and the MPEG-2 TS demultiplexer 20. In the case of DVD playback, however, as shown in FIG. 8, the MPEG-2 data is input from a DVD drive 34 to the decoder 22. MPEG-2 data read from an arbitrary recording medium in which the data is recorded may be input to the decoder 22. For example, a computer with a communication board having functions of the NIM 12 and the demultiplexer 20, a graphic board having an NTSC output function, and an MPEG-2 decoder board or a high-speed MPU for playing back the MPEG-2 data using software can serve as the video playback apparatus shown in FIGS. 4 and 8. Although the MPEG-2 decoder 22 is shown in FIG. 4 as an example of a playback decoder for decoding video data encoded by a predetermined encoding system, the playback decoder is not limited to MPEG-2 decoders and any decoder compatible with the encoding system used to encode the data can be used. FIG. 4 illustrates an NTSC encoder 32 as an example of a display encoder, but any decoder conformable to the available display can be used. For example, PAL (Phase Alternation by Line)-system encoders and SECAM (Sequentiel Couleur A Memoire)-system encoders may be used.

As described above, specific embodiments of the present invention have been described so far, but the present invention is not limited to these embodiments. Also, any modification, variations or equivalent arrangements which may occur to those skilled in the art should be considered to be within the scope of the invention.

There have thus been shown and described an apparatus and a method for playing back video which fulfill all the objects and advantages sought therefor. Many changes, modifications, variations and other uses and applications of the subject invention will, however, become apparent to those skilled in the art after considering this specification and the accompanying drawings which disclose the preferred embodiments thereof.

All changes, modifications, variations and other uses and applications which do not depart from the spirit or scope of the present invention are deemed to be covered by the invention, which is to be limited only by the claims which follow.

What is claimed is:

1. A video playback apparatus comprising:

a playback decoder for decoding video data encoded by a predetermined encoding system;

a display encoder for encoding the decoded video data into a display signal to be output to a display device;

format setting means for setting a data format for the video data to be transmitted from the playback decoder to the display encoder, wherein the data format set by the format setting means includes a type of encoding, an order of data transmission and a bus width for the video data; and format changing means for changing the the type of encoding, the order of data transmission and the bus width set by the format setting means.

2. The apparatus according to claim 1, further comprising means for synchronizing the data format of the video data decoded by the playback decoder and the data format of the video data encoded by the display encoder.

3. The apparatus according to claim 2, wherein said format changing means includes means for indicating a change of the data format at predetermined time intervals.

4. The apparatus according to claim 3, wherein said predetermined time intervals are determined according to horizontal or vertical synchronization of said display signal.

5. The apparatus according to claim 1, wherein said playback decoder includes an MPEG-2 decoder for decoding video data encoded according to an MPEG-2 standard.

6. The apparatus according to claim 5, wherein said display encoder includes an NTSC encoder for encoding the video data decoded by the playback decoder into an NTSC signal.

7. A method for playing back video data comprising the steps of:

setting a data format that includes a type of encoding, an order of data transmission and a bus width for video data;

decoding video data encoded by a predetermined encoding system into video data whose data format is set by the format setting step;

encoding the decoded video data into a display signal to be output to a display device; and changing the a type of encoding, an order of data transmission and a bus width set by the format setting step.

8. The method according to claim 7, further comprising the step of synchronizing the data format of the video data decoded by the decoding step and the data format of the video data encoded by the encoding step.

9. The method according to claim 8, wherein said format changing step changes the data format at predetermined time intervals.

10. The method according to claim 9, wherein said predetermined time intervals are determined according to horizontal or vertical synchronization of said display signal.

11. The method according to claim 10, wherein said decoding step includes decoding video data encoded by an MPEG-2 standard.

12. The method according to claim 11, wherein said encoding step includes encoding video data decoded by the decoding step into an NTSC signal.

13. A method of protecting decoded digital data sent with a data format from a video decoder to a display encoder, the display encoder providing a display signal to a display device, the method comprising the steps of:

dynamically changing the data format in which the video decoder provides decoded data to the display encoder by changing a type of encoding, an order of data transmission and a bus width of the decoded data; and updating the display encoder with the data format used by the video decoder in providing decoded data.

14. The method of claim 13, wherein in only data formats complying with published standards are used.

15. The method according to claim 13, wherein said step of updating is synchronized with said step of dynamically changing the data format in which the video decoder provides decoded data.

16. The method according to claim 13, wherein said step of dynamically changing the data format, changes the data format at predetermined time intervals.

17. The method according to claim 15, wherein said step of dynamically changing the data format, changes the data format at predetermined time intervals.

18. The method according to claim 16, wherein said predetermined time intervals are determined according to horizontal or vertical synchronization of the display signal.

19. The method according to claim 17, wherein said predetermined time intervals are determined according to horizontal or vertical synchronization of the display signal.

20. The apparatus according to claim 1, further comprising a first register, a second register and a third register for storing the type of encoding, the order of data transmission and the bus width, wherein the first register, the second register and the third register are located on different components of the apparatus.

* * * * *